COLOUR TELEVISION AND LIKE SYSTEMS

Filed Jan. 7, 1957 2 Sheets-Sheet 1

INVENTOR
PIETER SCHAGEN
BY
Fred M. Vogel
AGENT

Dec. 20, 1960

P. SCHAGEN 2,965,704

COLOUR TELEVISION AND LIKE SYSTEMS

Filed Jan. 7, 1957

2 Sheets-Sheet 2

INVENTOR
PIETER SCHAGEN

BY Fred M. Vogel
AGENT

United States Patent Office 2,965,704
Patented Dec. 20, 1960

2,965,704

COLOUR TELEVISION AND LIKE SYSTEMS

Pieter Schagen, Salfords, near Redhill, England, assignor, by mesne assignments, to North American Philips Company, Inc., New York, N.Y., a corporation of Delaware Filed Jan. 7, 1957, Ser. No. 632,868

Claims priority, application Great Britain Feb. 2, 1956

6 Claims. (Cl. 178—5.4)

Figures 1, 2, 7:
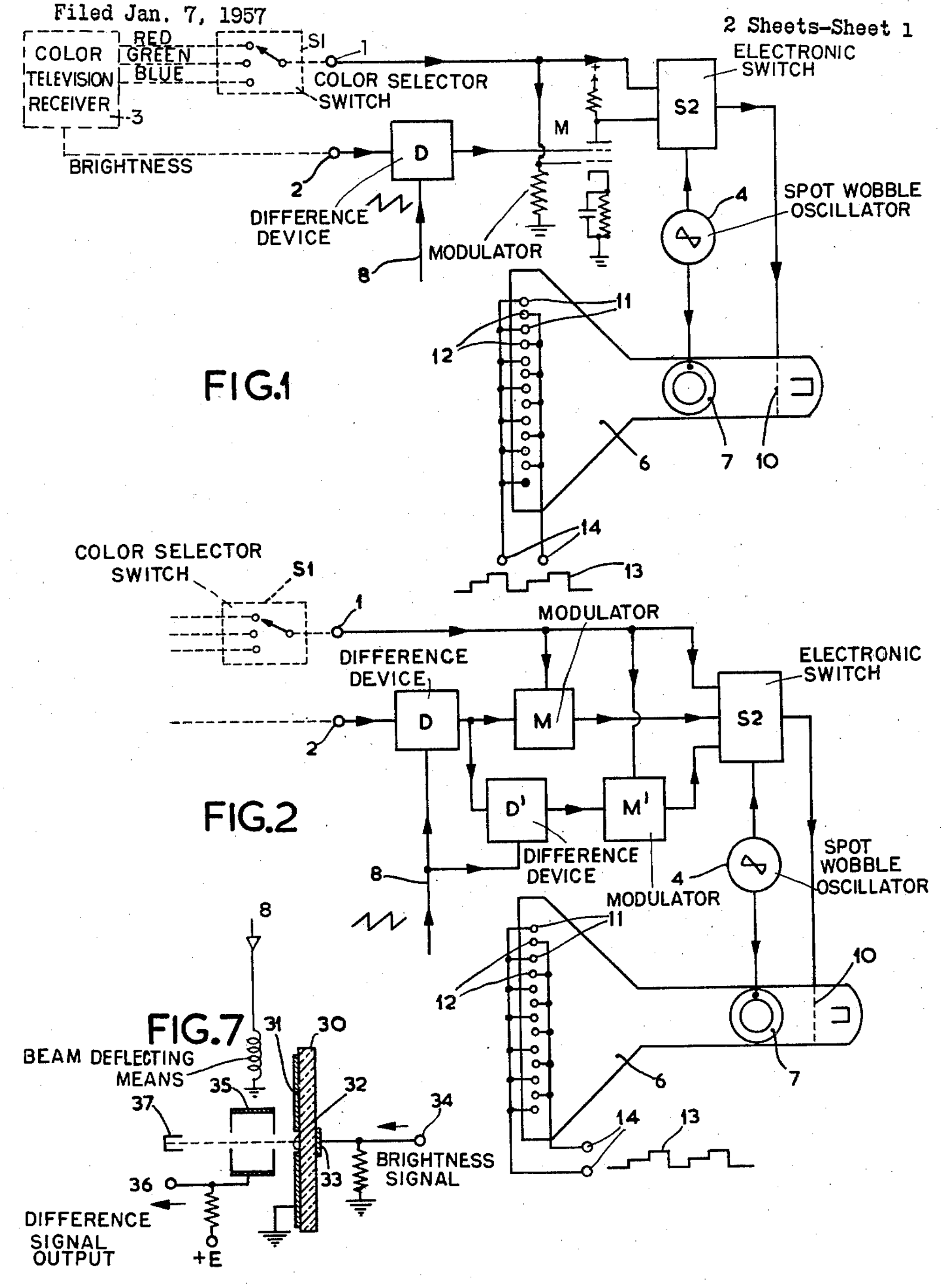

This invention relates to colour television and like systems.

From many points of view it would be desirable to display the colour information line-sequentially rather than simultaneously or dot-sequentially, but known proposals for line-sequential display suffer the disadvantages that either the bandwidth occupied by the transmitted signals has to be increased to permit a higher line frequency for the same definition or else so-called colour flicker or colour creep are noticeable.

It is an object of the invention to provide a display system wherein colour information can be presented line-sequentially without requiring an increase in line frequency and consequently in bandwidth to avoid the appearance of colour creep or colour flicker.

A method of displaying as a colour picture combined brightness video signals supplied continuously throughout each line of a raster and tri-colour signals supplied line-sequentially according to the invention comprises the steps of effecting each line scan of the predetermined raster as a simultaneous scan of a group of two or more lines of the raster in a common colour on a display system in which the colour of the display is controllable, effecting a frame scan to cause groups of lines to follow each other in a regular progression, changing the colour of the display line-sequentially so that each line of the raster is displayed in at least two colours within one complete frame scan, causing the display system to display one line of each group in accordance with the actual video signals supplied, obtaining a modified video signal for the or each other line of the group by derivation from said actual supplied signals and from the brightness signal appertaining to the respective other line, and causing the display system to display the or each other line of the group in accordance with the respective modified signal, the or each modified signal being such that corresponding picture elements of any two lines of each group are displayed with a light intensity ratio which is a direct function of, or equal to, the ratio between the brightness values of the supplied signals relating to the same picture elements.

Such a display method can be carried out with the aid of a storage or delay process to render accessible simultaneously the brightness signals appertaining to all the lines of a group and thus permit derivation of the modified signal or signals.

Apparatus according to the invention for displaying as a colour picture combined brightness video signals supplied continuously throughout each line of a raster and tri-colour signals supplied line-sequentially, comprises a display system in which the colour of the display is controllable, means for effecting each line scan of the predetermined raster as a simultaneous scan of a group of two or more lines of the raster in a common colour, means for effecting a frame scan to cause groups of lines to follow each other in a regular progression, means for changing the colour of the display line-sequentially so that each line of the raster is displayed in at least two colours within one complete frame scan, means for causing the display system to display one line of each group in accordance with the actual video signals supplied, means for obtaining a modified video signal for the or each other line of the group by derivation from said actual supplied signals and from the brightness signal appertaining to the respective other line, and means for causing the display system to display the or each other line of the group in accordance with the respective modified signal, the or each modified signal being such that corresponding picture elements of any two lines of each group are displayed with a light intensity ratio which is a direct function of, or equal to, the ratio between the brightness values of the supplied signals relating to the same picture elements.

The lines of a group can be displayed by separate light spots generated by separate means.

Alternatively, the display system may comprise a cathode ray tube having a screen composed of tri-colour triplets of luminescent strips and means for causing an electron beam to effect a spot-wobble motion transverse to the line scan direction and extending to all the lines of a group. Such a system may be used in conjunction with means for switching the display system cyclically to the appropriate one of a group of channels provided for carrying the said actual video signals and the or each modified signal respectively, the switching means being adapted to operate in synchronism with the spot-wobble means.

As will be appreciated the term "simultaneous," used above in connection with the scanning of a group of lines, is intended to cover also the above spot-wobble case in which the scans are not strictly simultaneous but are nevertheless effectively simultaneous due to the fact that the spot-wobble frequency is very great as compared with the line frequency.

The required brightness video signals and tri-colour line-sequential signals may be supplied directly in the desired form by a transmission system as described in patent application Serial No. 632,851, filed January 7, 1957. Alternatively, the desired signals may be derived from signals of different form which may contain more information than is required for the present purposes.

Thus the receiver may utilise known transmission systems arranged to provide continuous tri-colour information, for example systems which employ three channels, namely, a luminance channel for transmitting brightness information and two chrominance channels with subcarriers for transmission of hue and saturation information; instantaneous three-colour values are normally derived from such information at the receiver, but in the present instance two colour values out of three would be discarded in a line-sequential manner while preserving the brightness information. Although there is some wastage of information in such a process, the loss is in part made good by the method of presentation which in effect applies in the frame direction a principle already used by the transmission system in the line direction. As is well known, such systems employ the principle of so-called "mixed highs" whereby colour information at the higher frequencies is omitted in the line-scan direction. This is possible since lack of colour in the fine details displayed is not detected by the eye. With presentation in accordance with the invention, the "mixed highs" principle is applied in the frame scan direction.

On the other hand, a receiver employing display apparatus according to the invention may utilise signals providing only continuous colour information on three colour channels without a brightness signal, in which case the brightness signal is derived from a combination of the three colour signals.

The display system may comprise any suitable display screen system in which the colour of the scanning spot is controllable sequentially and, since the required frequency of such changes is only equal to the line frequency of the raster, the invention renders practicable systems which allow colour-switching at such frequencies although not capable of colour-switching at the much higher frequencies demanded by dot-sequential systems. The screen system may for example be provided by a single-gun cathode-ray tube as described in British patent specification 737,030. According to said specification, a cathode-ray tube for reproducing television images with three colour components is characterized in that it embodies a luminescent screen having two superposed layers which luminesce in two different colours when bombarded by electrons and are supported on that side of a transparent substratum which faces the cathode of the tube; and in that a grid electrode is located between the said screen and the cathode and is coated on the side facing the observer with a substance which luminesces in a third colour when bombarded by electrons; and in that a colour-selecting electrode is located between the said grid electrode and the observer. Alternatively, the screen system may be provided by a single-gun cathode ray tube as described in British patent specifications 648,257 and 718,652 and related patent specifications.

Specific embodiments of the invention employing spot-wobble will now be described by way of example with reference to the diagrammatic drawings accompanying the specification.

Referring to Figure 1 of the drawings, parts of the circuit of a television receiver to which the invention relates are shown in block schematic form, other known parts which do not concern the invention being omitted for the sake of clarity.

The circuit arrangement of Figure 1 is adapted to display a group of two lines at each line scan, such lines being always separated by an intermediate line which will be assumed at first to be blacked out.

The circuit arrangement can of course utilise, as aforesaid, a form of transmission as described in U.S. patent application Serial No. 632,851, filed January 7, 1957, in which brightness video information is supplied continuously whereas colour video information is only supplied line-sequentially. Line-sequential transmission is also disclosed in United States Letters Patent No. 2,870,248. However, where the circuit arrangement is to be used in conjunction with a conventional colour transmission system, for example the N.T.S.C. system or a modification thereof, an additional unit must be used to convert the signals and select line-sequentially one incoming colour signal at a time at the normal line frequency of the raster, and such a unit is represented at S1 in the schematic form of a three-way switch connected to a colour video input terminal 1. For example, referring to Figure 1 of the drawing, a conventional color television receiver 3 may be employed, the receiver 3 providing continuous red, green and blue output signals to the controls of the switch S1.

A brightness video input terminal is indicated at 2 and is supplied with continuous brightness video information, for example, from the television receiver 3.

The line-sequential colour information appearing at terminal 1 is supplied to electronic switching means S2 which operates at the spot-wobble frequency and is actuated for this purpose by an oscillator 4 generating control signals at the spot-wobble frequency which is higher than the line-scanning frequency.

The switch means S2 serves to switch the beam of cathode ray display tube 6 between two channels carrying the signals representing the two line modulations which the beam is to display in any given line scan. Such switching is, of course, synchronous with the spot-wobble motion which latter is therefore effected by an auxiliary deflection system controlled by the same oscillator 4 and represented schematically as an auxiliary deflection coil 7. The spot-wobble frequency does not need to be synchronized with the line-scanning frequency.

The two channels which have to be switched by the switch means S2 are the actual or true colour channel of terminal 1 (carrying the incoming colour signals) and the modified colour channel which will now be described. The latter channel comprises a difference device D which stores the brightness information of one line and provides the desired difference signal representing the difference in the brightness modulation between that line and the other line to be displayed, which lines will be referred to for convenience as *n* and (*n*—2) respectively. Such a device requires line scanning synchronized with the line scanning of the picture tube 6 and for this purpose a suitable saw-tooth wave-form is supplied to the device via a conductor 8. The output of device D is applied as a modifying signal to the incoming colour signal, and this modification is effected in a modulator M. The output of modulator M will in this example be the incoming colour signal appertaining to line *n* modified by the difference in brightness between lines *n* and (*n*—2) and said output is carried by the second channel connected to the switching means S2.

Figures 3, 4, 5:
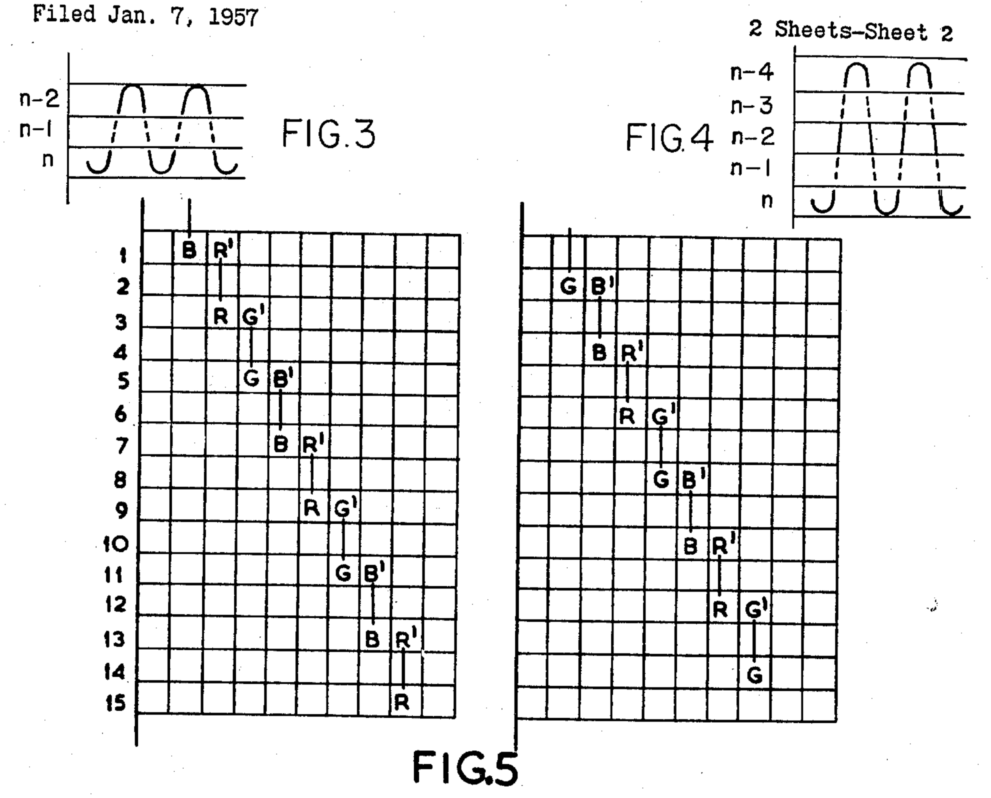

If the intermediate line (*n*—1), which does not form part of the group, is to be blacked out, this action may also be taken by the means S2, and the modulation of the beam through its spot-wobble scanning motion may appear as shown diagrammatically in Figure 3, the information displayed at the lower peaks being for example the incoming red signals on line *n* while the information displayed at the upper peaks of the spot-wobble represents the same red information as modified by the brightness difference between lines *n* and (*n*—2). The central portion of the spot-wobble is blanked out by means of clipper circuits. With this arrangement it is not possible to display all three colours on all lines of the raster within a single complete frame, although such complete coverage can be obtained in something less than two complete frames. In cases where colour flicker or colour creep would otherwise be apparent, the colour sequence may be changed from a red-green-blue-red sequence to some more appropriate sequence such as red-green-blue-green-red. However, as an alternative, the intermediate line (*n*—1) may be displayed as a line additional to the group instead of being blacked out, the intensity of the colour displayed at any time being a value intermediate between the values displayed on lines *n* and (*n*—2). Such intermediate values may be obtained by interpolation effected in a device added to the means S2.

In any event, the synchronously switched video information provided at the output of means S2 is supplied to a beam-intensity control electrode of tube 6 indicated diagrammatically at 10. In this example the tube 6 is a tri-colour single-gun tube of the type described inter alia in British patent specifications 648,257 and 718,652. Such a tube has a post-deflection grid structure comprising two interlaced sets of vertical wires 11, 12. Where such a tube is used for displaying colour pictures in the conventional manner, said grid wires have applied to them alternating voltages of the same frequency as the picture element frequency, which mode of operation has some disadvantage due inter alia to low brightness and R.F. radiation problems. However, when used for the purpose here described said grid 11, 12 need only have applied to its grid terminals 14 a D.C. voltage which is changed in amplitude at line frequency in accordance with a stepped waveform 13 so as to change the colour displayed at a line-sequential rate corresponding to, and synchronised with, the switching effected by the device S1.

Figure 2 of the drawings shows schematically a receiver circuit arrangement similar to that of Figure 1 except for the provision of a third channel to permit simultaneous spot-wobble display of a group of three lines in one colour instead of two lines, such lines being referred to for convenience as *n*, (*n*—2) and (*n*—4) if they are spaced apart by single-line spacings. Like parts are indicated by the same reference numerals.

The additional channel provided for the display of line ($n$—4) comprises a further device D′ similar to the device D, such further device providing a second signal modification corresponding to the brightness difference between lines ($n$—2) and ($n$—4). The output of D′ is used as a double-modification signal and is applied to a further modulator M′ which is also supplied with the incoming colour signal of channel 1. The output of modulator M′ is supplied to the switching means S2 which thus performs in effect three-way switching.

As in the arrangement of Figure 1, the intermediate lines ($n$—1) and ($n$—3) may be blacked out, in which case the spot-wobble display may be as shown schematically in Figure 4, the dotted portions of the spot-wobble scan path representing portions blacked out by the action of means S2. In this arrangement there is little advantage in providing the lines ($n$—1) and ($n$—3) additional to the group with interpolated information since, with a triple line scan, all lines of the raster are displayed at least once in all the three colours within one complete frame.

Figure 6:
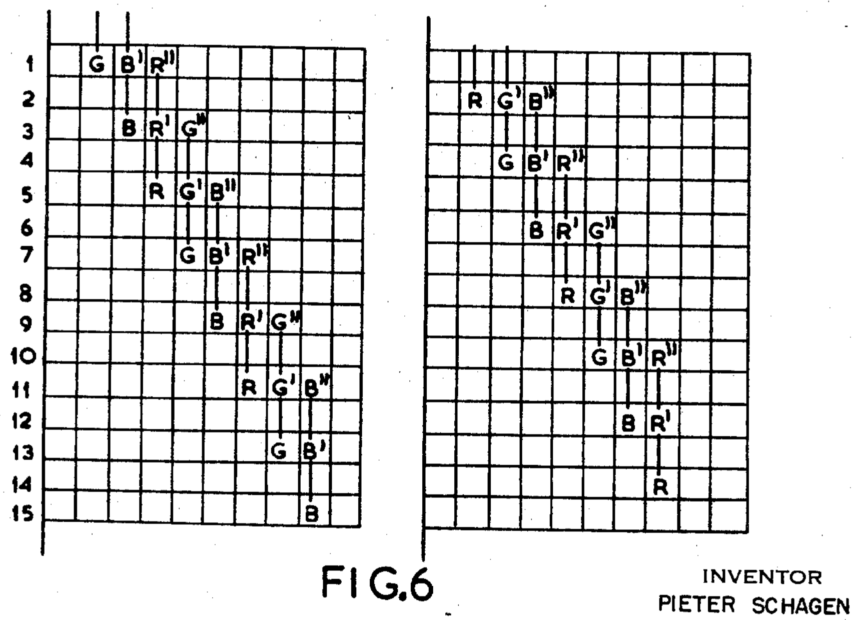

The scanning methods described above in relation to Figures 3 and 4 may be applied either to the conventional interlaced type of raster or to a non-interlaced raster. Sequences applicable to a 405-line interlaced raster are shown schematically in Figures 5 and 6, Figure 5 representing the two-line sequence of Figure 3 with blacking-out of the intermediate line while Figure 6 relates to the scanning mode of Figure 4. In each case the two interlaced partial frame-scans are shown on either side of a central dividing line. The colours are represented by the letters R, G, B, for actual incoming information, R′, G′, B′, for colour information with single modification and (in Figure 6) R″, G″, B″ for colour information with double modification.

In the case of Figure 5 a change of the starting colour may be effected at each complete frame in such manner that the cycle is completed within three complete frames with each line displayed twice in each colour, i.e. one with actual received information and once with modified information. For this purpose the complete frame following that of Figure 5 may start with unmodified or actual red (R) in place of blue B at line 1 and actual blue (B) at line 2, while the third complete frame starts with actual green (G) at line 1 and actual red (R) at line 2.

In spite of the fuller coverage afforded by the sequence of Figure 6, it may be desirable to provide a similar cyclical change over three complete frames so that every line receives actual information once in a three-frame period. For this purpose the frame following that shown may start with actual blue at line 1 instead of green, the third frame starting with actual red at line 1.

As aforementioned, the devices D and D′ providing the brightness-difference signals may be electric discharge tubes employing known electronstatic equilibrium-writing techniques and Figure 7 shows schematically the electrode structure of such a tube. The tube of Figure 7 comprises a target 30 of insulating material, a conductive barrier grid 31 covering one face of said target except for a portion 32 exposed by a slit in the grid 31, a back plate 33 connected to a signal input terminal 34, a collector 35 connected to a source of positive potential +E and to a signal output terminal 36, and a gun 37 for directing an electron beam at the exposed target portion 32. Further means are provided internally or externally of the tube for deflecting the beam along the slit in a plane normal to that of the drawing at line frequency in synchronism with the line scan of the picture tube raster.

The incoming brightness signal can be applied to the backplate 33 so that the target surface 32, through its capacitive coupling with the backplate 33, follows automatically these potential variations. The unmodulated electron beam scanning always the same line on the target surface 32 will then stabilise each target element along this line at an equilibrium potential, mainly determined by the potential of the barrier grid 31, the amount of positive or negative charge set up on each target element depending upon the instantaneous value of the potential applied to the backplate 33, i.e. the brightness signal for such element.

After completing one line scan the electron beam is suppressed during the line-blanking period and then scans the line again. If the brightness signal for this next line is exactly the same as for the previous line, each target element has already been stabilised at its appropriate potential during the previous line scan and no charge will be deposited by the electron beams. The current to the collector electrode 35 will then be constant and no "difference signal" is obtained. If, however, the brightness signals corresponding to some target elements are different from those of the previous line, the scanning beam will deposit negative charge or set up (by secondary emission) positive charge on these elements, and the electron current flowing to the collector electrode 35 is accordingly modulated with the "brightness difference" signal.

Although the spot-wobble wave-form shown in Figures 3 and 4 is sinusoidal, other wave-forms may be used, for example rectangular or sawtooth waveforms.

As regards the spaced line grouping of Figure 3 it does not necessarily imply the use of an interlaced raster but it is very suitable for application to such as raster. On the other hand it may be said, for the sake of clarity that the simplest line-group arrangement of two adjacent lines (one displayed in accordance with actual signals and the other with modified signals) is appropriate for a non-interlaced frame scan system.

What is claimed is:

1. Apparatus for displaying as a colour picture combined brightness video signals supplied continuously throughout each line of a raster and tri-colour signals supplied line-sequentially, which apparatus comprises a display system in which the colour of the display is controllable, means for effecting each line scan of the predetermined raster as a simultaneous scan of a group of two or more lines of the raster in a common colour, means for effecting a frame scan to cause groups of lines to follow each other in a regular progression, means for changing the colour of the display line-sequentially so that each line of the raster is displayed in at least two colours within one complete frame scan, means for causing the display system to display one line of each group in accordance with the actual video signals supplied, means for obtaining a modified video signal for each of the other line or lines of the group by derivation from said actual supplied signals and from the brightness signal appertaining to the respective other line, and means for causing the display system to display the other line or lines of the group in accordance with the respective modified signal, each modified signal being such that corresponding picture elements of any two lines of each group are displayed with a light intensity ratio which is a direct function of, or equal to, the ratio between the brightness values of the supplied signals relating to the same picture elements.

2. Apparatus according to claim 1 wherein the display system comprises a cathode ray tube having a screen composed of tri-colour triplets of luminescent strips in combination with means for causing a cathode ray beam to effect a spot wobble motion transverse to the line scan direction and extending to all the lines of a group.

3. Apparatus according to claim 2 including means for switching the display system cyclically to the appropriate one of a group of channels provided for carrying the said actual video signals and each modified signal respectively, the switching means being adapted to operate in synchronism with the spot-wobble means.

4. Apparatus according to claim 1 wherein the means for obtaining each modified video signal includes a storage cathode ray tube adapted to effect electrostatic equilibrium writing on an insulating target in such manner that a difference signal can be derived from a collector electrode of the tube.

5. Apparatus according to claim 1 wherein the display system is arranged to display a group of lines such that any one line of the group is spaced from the or each other line of the group by a distance corresponding to one line of the raster.

6. Apparatus according to claim 5 including means for displaying as a line additional to those of the group each line of the raster corresponding to the spacing between two lines of a group, and means for obtaining a signal by interpolation between the signals used for displaying the respective lines of the group and for causing said additional line to be displayed in accordance therewith.

References Cited in the file of this patent

UNITED STATES PATENTS 2,825,754 Toulon ---------------- Mar. 4, 1958